United States Patent [19]

Parrack et al.

[11] 4,323,876
[45] Apr. 6, 1982

[54] METHOD FOR REDUCING MULTIPLE EVENTS IN A SEISMIC RECORD

[75] Inventors: Alvin L. Parrack, Bellaire; Delbert R. Lunsford, Houston, both of Tex.

[73] Assignee: Texaco Inc., White Plains, N.Y.

[21] Appl. No.: 327,267

[22] Filed: Jan. 29, 1973

[51] Int. Cl.$^2$ .............................................. G01V 1/36
[52] U.S. Cl. ...................................... 367/40; 364/421; 367/59
[58] Field of Search ............... 340/15.5 DP, 15.5 MC, 340/15.5 CC, 7; 364/421

[56] References Cited

U.S. PATENT DOCUMENTS 3,550,074  12/1970  Kerns et al. .................. 340/15.5 DP
3,714,621  1/1973  Waters ......................... 340/15.5 CC

*Primary Examiner*—Nelson Moskowitz

*Attorney, Agent, or Firm*—Carl G. Ries; Thomas H. Whaley; William J. Beard

[57] ABSTRACT

A search is made down each trace of a seismic record at the approximate period of the multiple events to find a trace segment which most resembles a selected later segment of the same trace. An autocorrelation procedure is initially employed to determine the approximate period of the multiples and a crosscorrelation procedure is then employed to determine the time alignment of the two segments which produces maximum correspondence between the two segments. The degree of correspondence is determined by a "least-squares-fit" procedure. A portion of the earlier segment is subtracted from the later segment. The amount of the earlier segment to be subtracted is determined by the degree of correspondence. The procedure is incremented along the trace until the entire trace has been processed. Each trace is handled in the described manner until the entire record has been processed.

22 Claims, 11 Drawing Figures

SEISMIC TRACE WITH PRIMES AND MULTIPLES

AUTOCORRELATION FUNCTION

AUTOCORRELATION FOR ALTERNATING SERIES

WINDOW TAPER FUNCTION

SEISMIC TRACE WITH MULTIPLES SUPPRESSED

PRIMES AND MULTIPLES

PRIMES WITH MULTIPLES SUPPRESSED

EXTRACTED MULTIPLES

METHOD FOR REDUCING MULTIPLE EVENTS IN A SEISMIC RECORD

CROSS REFERENCE TO RELATED APPLICATIONS

U.S. patent applications Ser. No. 230,810 filed Mar. 1, 1972, entitled METHOD FOR ENHANCING SEISMIC DATA and Ser. No. 305,386, filed Nov. 10, 1972, entitled METHOD FOR ENHANCING COMMON DEPTH POINT SEISMIC DATA, are related to the present application.

BACKGROUND OF THE INVENTION

1. Field of the Invention

In a particular application of the method of the present invention, seismic data is processed to remove or suppress data produced by multiple reflections from the same subsurface reflector. The method may be employed to enhance data of any type which contains a prime event and a multiple of the prime where the multiple exhibits a discernable periodicity.

2. Brief Description of the Prior Art

In seismic data and in other types of data there are multiple events produced by seismic waves which have traveled two or more times through the shallow formations and arrived at later times on the records. Under certain conditions which are found in many areas, the amplitudes of the multiple events are large enough to interfere with the prime events and, in some cases may even become larger in amplitude than the prime. Under any of these conditions, the prime events are obscured by the interference of the multiple events and the prime events may be completely masked by the multiple events when the amplitude of the multiples is large.

One major problem in dealing with multiple reflections stems from the fact that the period of the multiples may vary along the trace. As a result of this variance, multiple elimination processes which employ the average of the multiple period will have differing effectiveness depending upon the range of departure of the periods from the average.

The causes for the changing periods of the multiple events are many. A major cause is the difference in the length of the travel path for the seismic wave during the prime or initial reflection and subsequent reflections. For example as in marine seismic recording, if the source and detector are below the earth's surface, the prime reflection path length is directly from the source to the reflector and back up to the detector. The returning wave, however, travels upwardly beyond the detector and is reflected back down from the interface at the surface. The subsequent upward reflection of the same wave from the same subsurface reflector produces a multiple when it is picked up by the detector. The travel time of the multiple is different from that of the prime by the amount of time required to travel from the source to the surface and back down to the detector. Subsequent reflections of the same wave may also travel different path lengths so that the travel time of the multiples may be different from each other as well as from the prime.

Other situations, including a dipping reflector, may produce deviations from the exact integral multiples of the travel times of successive reflections of the same wave. The net result is that the times of appearance of multiples on the seismic records often deviate from exact, predictable times derived from the measured travel times of prime events through the layers producing multiples.

Several techniques including visual inspection have been employed to remove and suppress multiples in the record. One technique employs velocity or moveout filters which discriminate between signal and noise on the basis of a difference in the moveout or apparent velocity of coherent events across an array of seismic traces. In another prior art technique, synthetic multiple events are produced by a correlation technique and the synthetic multiples are then visually compared with the actual trace to assist in locating prime events. It has also been suggested to suppress the multiples by converting the traces into their real and imaginary parts by Fourier transformation. The two parts of the trace are then employed to form operators which may be used to remove distortion components in the trace.

Yet another technique for multiple elimination employs "inverse convolution filtering" or deconvolution filtering in which a linear prediction error filter having an impulse time response approximately the inverse of the multiple is applied to the seismic trace. Various other techniques have also been proposed and employed with differing degrees of success.

SUMMARY OF THE INVENTION

A method of processing seismic data is disclosed in which multiple events, which may mask the prime events in a seismic record, are suppressed or removed from the record. In the method, the trace segment in a first data window on a given trace is examined relative to the trace segment in a second data window of the same size appearing earlier in the same trace. An approximate period $\tau 1$ for the multiples to be eliminated is estimated by computing the autocorrelation function for a selected data window on the trace being processed and measuring between prominent peaks or valleys in the autocorrelation function. If an alternating series of multiples is present, appropriate corrections are made so that alternating and non-alternating series may be similarly processed during subsequent steps in the method.

Once a $\tau 1$ is established, the beginning of a data window B1 is positioned on the trace at a point equal to the start time for the procedure plus $\tau 1$, plus "search lag" SL. (The search lag is the amount of positive or negative time shift to be permitted for another window A2 during the crosscorrelation step to be described.) A window B2 is then centered on window B1 and a window A2 is centered on a point $\tau 1$ earlier in time than the midpoint of B2. For purposes of brevity, henceforth a time point occurring earlier in time than some given point will be referred to as being to the left of the given point and a point occurring later in time will be referred to as being to the right of the given point. This represents conventional time display of seismic data. The amplitude and time information for the analog data trace is preferably provided in discrete data points and amplitude values coded in digital form. The trace segment in window B2 is then "tapered" by multiplying it by a cosine taper function to provide continuity between adjacent segments as the process is incremented along the trace. The segments in A2 and B2 are crosscorrelated beginning with the window A2 shifted to the left of its original position by an amount equal to the search lag SL. The window A2 is then shifted to the right, one data point at a time, and the included trace segments in A2 and B2 are crosscorrelated at each succeeding point until the window A2 has been shifted to the right of its original position by the amount of the search lag. Values of the crosscorrelation are examined to determine the time alignment of window A2 with window B2 which produces the maximum crosscorrelation value. This alignment is employed to establish an adjusted period τN for the multiples. τN closely approximates the true period of the multiples included within the windows A2 and B2. A fourth window A1 is then positioned on the trace beginning at a distance τN before the beginning of window B1.

Trace segments included within windows A1 and B1 are employed to compute the degree of correspondence between the two segments which is expressed as a multiplier K, ranging in value between assigned upper and lower limits. A percentage of each of the data point amplitude values of the trace segment in window A1, determined as a function of the multiplier K, is subtracted from corresponding data point values of the segment in window B1. The resulting difference signal forms a trace segment in which multiples have been suppressed or eliminated. The procedure is incremented down the trace by advancing the window B1 ½ window length to the right and repeating the described steps starting with the value for τ1 established by the autocorrelation process.

The length of windows A2 and B2 may be made greater than or equal to the windows A1 and B1 depending upon the traces under examination. As will be explained, this flexibility permits the process to stabilize the period of the multiples while maintaining the ability to adjust to changes in the period. Thus, the method of the present invention automatically determines the presence and location of multiples in the trace even though the period of the multiples is changing along the trace.

Once a given trace has been processed, the remaining traces may be processed in the same manner.

The method of the present invention may be employed with previously enhanced data or may be employed with unprocessed data. If desired, the method of the present invention may be practiced simultaneously with the methods described in either of the previously mentioned related patent applications. It will also be appreciated that the method of the invention may be employed before, after or as a part of other processing procedures designed to suppress or eliminate noise in seismic records.

From the foregoing, it will be understood that one of the primary objects of the present invention is to provide a process for suppressing multiple events in a seismic record by examining separate segments of a single trace, determining the degree of correspondence between those portions of the segments which bear the greatest similarities to each other, extracting from one segment a part of the amplitudes of the other segment and incrementing the method until an entire trace or record has been processed.

The foregoing objects, features and advantages of the invention, as well as others, may be more readily understood by reference to the following detailed explanation, the related drawings and the claims.

DESCRIPTION OF THE ILLUSTRATED EMBODIMENT

Figure 1:
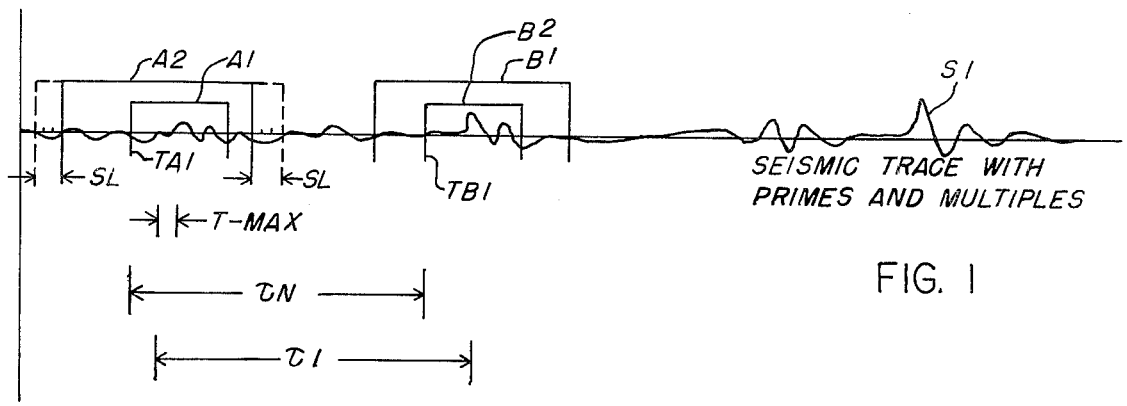
FIG. 1 is a seismic trace graphically illustrating a plurality of data windows positioned in accordance with the method of the present invention.

Referring to FIG. 1, there is illustrated a conventional seismic trace S1 having a plurality of trace segments which are graphically designated within data windows A1, A2 and B1, B2. As employed herein, the term "data window" or "window" is intended to define a time span over which a trace is to be examined or processed. The trace S1 is obtained by any suitable means and is a conventional analog "wiggle trace" or seismogram in which amplitude variations are depicted along the vertical axis and time is depicted along the horizontal axis. For use with digital processing equipment and techniques, the trace S1 is converted from the analog form to a digital form by conventional analog-to-digital equipment. In the conversion, the amplitude values of the analog waveform are measured at equal time intervals having a spacing which is established by a sampling rate calculated to reproduce a true digital representation of the analog signal. By this means, digital numbers representing the signal amplitude at selected intervals are associated with digital numbers representing each corresponding data point interval along the time axis.

The method of the present invention employs the fact that the trace waveforms of multiple events bear similarities to each other and that the similarities should occur at trace segments which are spaced from each other by the period of the multiple. Thus, assuming that the window B1 is positioned on the trace S1 as illustrated in FIG. 1, the trace segment within the window B1 is compared with that appearing within an equal length, earlier data window A1 spaced from the window B1 by an amount τN equal to the period of the multiple for the trace portion included within and between the windows A1 and B1. The length of the equal size windows A1 and B1 is preferably selected to include approximately one and one-half to two cycles of the waveform. As used herein, a "cycle" is defined as a characteristic waveform in the seismic trace similar to that of a full sine wave or cosine wave having a 360° period and may be established by visual inspection of one or more traces within a record. It will be appreciated, however, that this visual inspection step as well as other manual steps hereinafter described may be performed by automated processing techniques where appropriate or desired. Where the cycle length for the traces is relatively stable throughout the record, a single visual inspection is adequate to determine the length of the windows A1 and B1. Where the cycles may change in length beyond the limits established by a single window length, automated techniques may be employed to vary window length with changes in cycle length. An optimum length for the windows A1 and B1 is that which includes one and one-half to two cycles. As the window lengths are increased to include more cycles, the effectiveness of the processing may be reduced.

Figure 2:
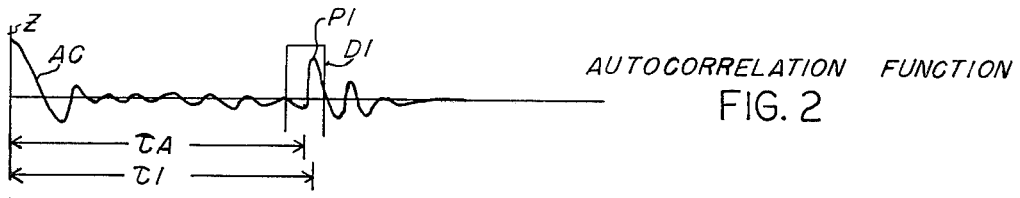
FIG. 2 is a time versus amplitude plot of a portion starting with the zero lag point of the autocorrelation function for the trace of FIG. 1.

As will hereinafter be more fully explained, an estimated value $\tau 1$ for the period of the multiples is obtained by an evaluation of an autocorrelation function AC for the trace S1. The autocorrelation function is illustrated in FIG. 2. Spacings between peaks or troughs in the autocorrelation function are employed to determine the estimated period $\tau 1$ of the multiples for the trace being processed which in turn is employed to initially position the search window A2 relative to the window B2.

The length of window A2 is selected to be equal to or greater than that of A1 and window A2 is employed with a window B2, of the same length as window A2, to determine the adjusted or actual period of the multiples appearing in the portion of the trace under examination. The period $\tau N$ is determined by a crosscorrelation procedure. As a part of this latter procedure, the data window A2 is shifted to the right and to the left of center by an amount equal to the search lag SL and at each data point between these two extremes, the waveform included within the window A2 is crosscorrelated with the trace segment included within the data window B2. The described procedure may also be considered as defining a window A2 which is longer than the window B1 by a desired amount, twice SL for example. Using the latter approach, a trace segment of the length B2 is crosscorrelated at each data point beginning at the left edge of the large window A2 and shifting to the right one data point at a time until the right edge of the large window A2 is reached. The data window B2 remains stationary during each of the crosscorrelations. The values of each of the crosscorrelations are examined to determine a T-MAX value which is a measure of that alignment of the window A2 relative to its original position at which the maximum crosscorrelation value is obtained. T-MAX is employed to establish the true period $\tau N$ of the multiples. One $\tau N$ is established, the window A1 is spaced $\tau N$ from the window B1 and the trace segment included within the window A1 is thus isolated as that being the most similar to the segment included within the window B1. The formal expression for the crosscorrelation function is given hereinafter in equation (3).

The difference in lengths between the windows A1, A2 and B1, B2 is due to the fact that small data windows and noise in the data as well as other factors can produce apparent multiples having largely differing values of $\tau N$. In fact, however, there is actually relatively little change in the periods $\tau N$ over the length of the trace and the change is gradual. By increaasing the lengths of the correlation windows A2 and B2, the effects of noise and other error producing factors are reduced so that a valid, gradually changing value for $\tau N$ may be obtained. On the other hand, by keeping the windows A1 and B1 of relatively small size, the accuracy of the process may be improved. Where the data is relatively noise free, the windows A2 and B2 may be the same length as the windows A1 and B1. Windows A2 and B2 are preferably no longer than required to obtain valid values for $\tau N$ so that the number of data point values to be multiplied in the crosscorrelations may be minimized. The lengths of windows A1, B1, A2 and B2 may be supplied by the program user based on previous experience. Alternatively, the program may compute these window lengths on the basis of the data itself.

Figure 6A:
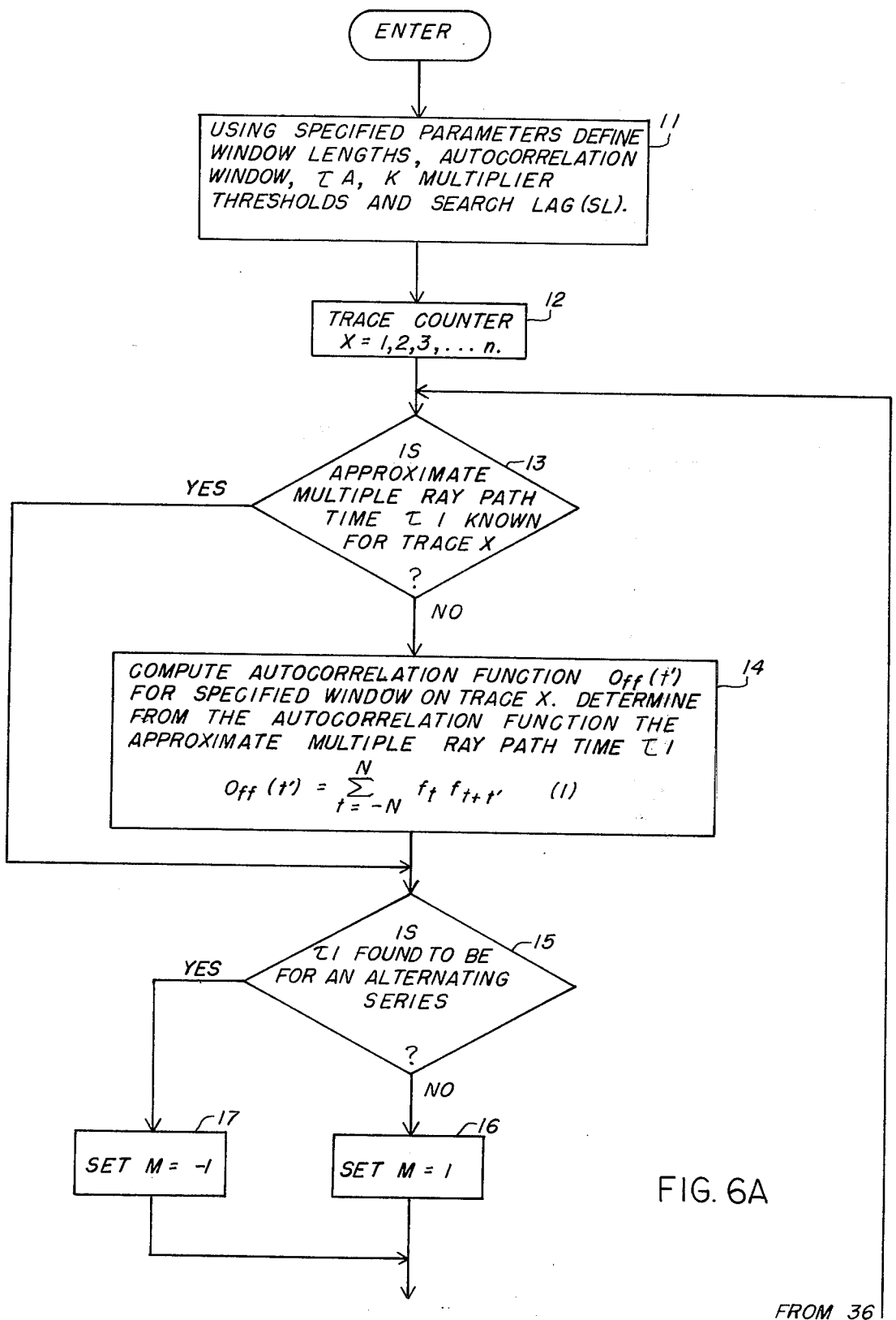
FIG. 6, comprised of segments 6A, 6B and 6C, is a flow diagram for the method of the present invention.
Figure 6B:
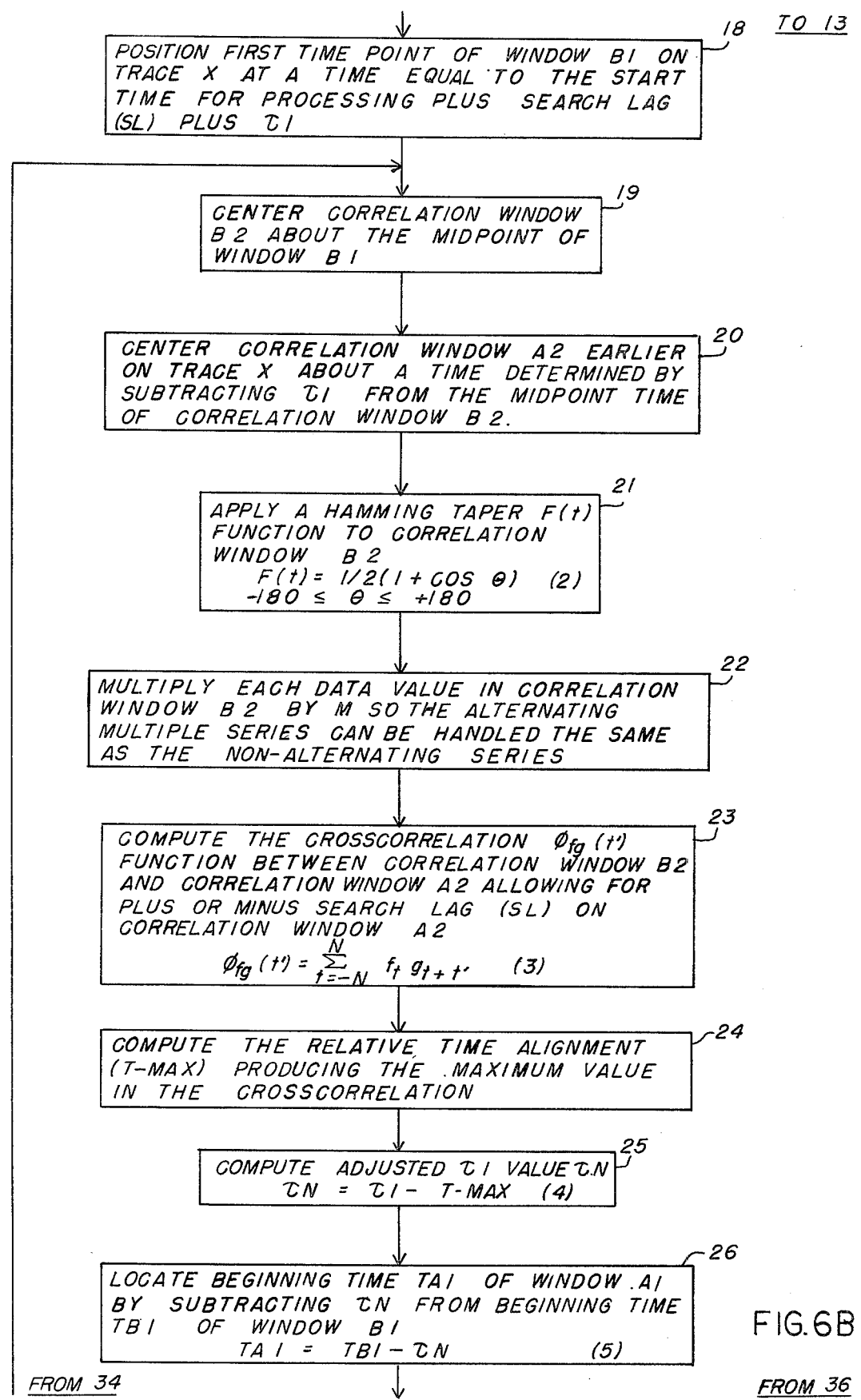
Figure 6C:
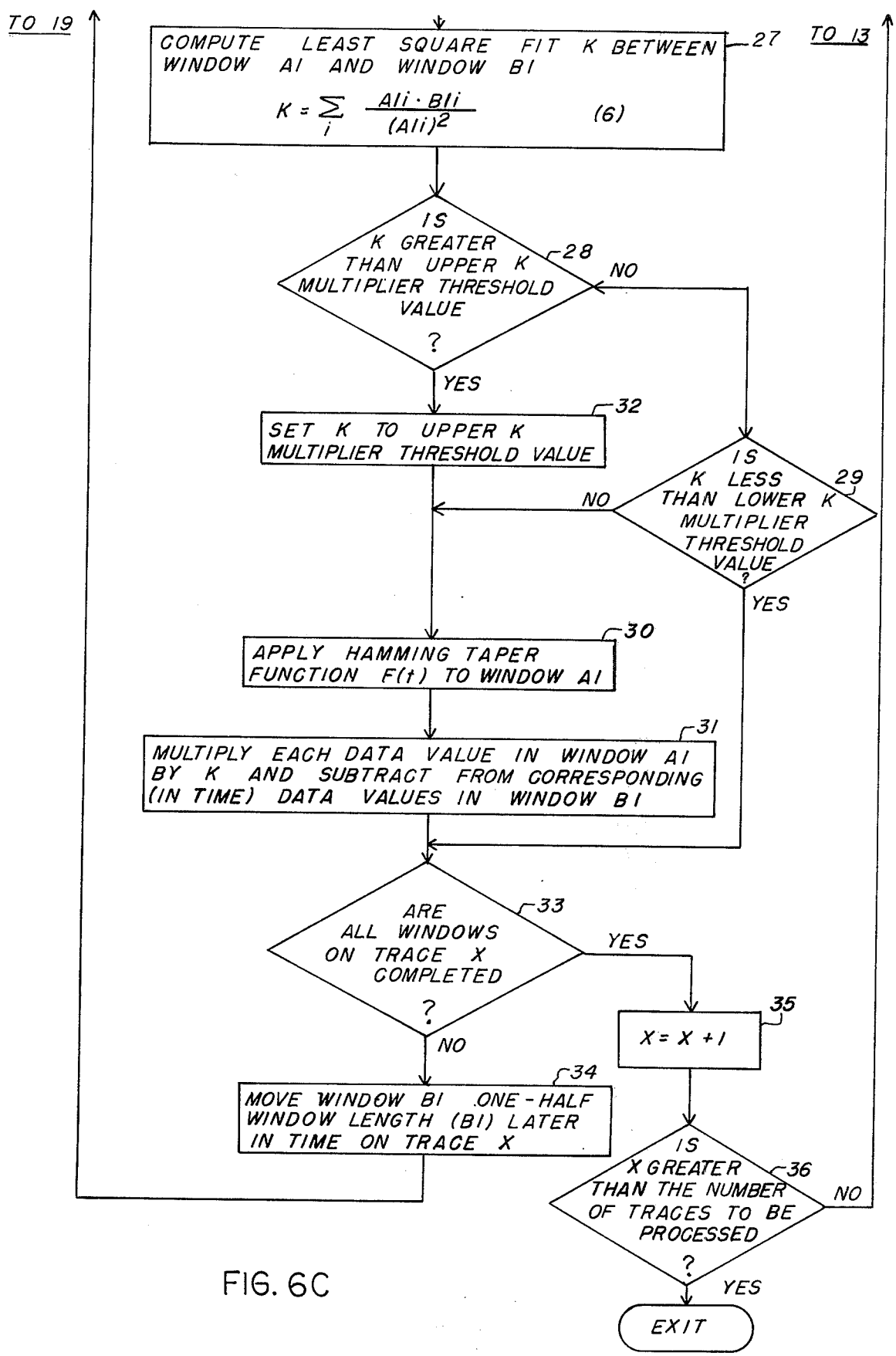

FIG. 6 illustrates a flow diagram for an exemplary digital computer program capable of performing the method of the present invention. The method may be employed using any general purpose digital computer system or may be employed using special purpose computers, analog computers or manual calculations. The initial steps of the method are defined in block 11 and the criteria for establishing the lengths of the A and B windows have already been given. The autocorrelation window length is normally specified by the user based also on experience or from visual inspection of the data. The window, indicated at D1 in FIG. 2, is centered on the autocorrelation function AC at a distance $\tau A$ from the "zero lag time" axis Z of the function. The zero lag time position is that which occurs when the selected portion of the trace X being autocorrelated is exactly aligned with itself thus producing maximum correspondence. The distance $\tau A$ is an estimate of the period of the multiples and is also normally user supplied. As with the window lengths, values for $\tau A$ are based on experience or visual inspection but may be determined using any suitable automated procedure.

The function AC is determined from the relationship $$AC = \phi_{ff}(t') = \sum_{t=-N}^{N} f_t f_{t+t'} \tag{1}$$

where:
$f_t$ = amplitude of the waveform of a seismic trace X; at time t
$f_{t+t'}$ = waveform amplitude of X at time $t+t'$,
$t'$ = incremental shift during each autocorrelation.

The autocorrelation function expressed in equation (1) is conventional and is of the type more fully described in *Geophysics*, Vol. 33, No. 1 (February 1968) pg. 193. One half of the autocorrelation function AC for a selected portion of the trace S1 is shown in FIG. 2. Only a portion of the seismic trace S1 having a strong prime event and several strong multiples is required for use in obtaining the autocorrelation function. The trace portion to be employed is selected usually by inspection.

Figure 3:
FIG. 3 is a plot similar to that of FIG. 2 illustrating a characteristic waveform for an alternating series.

As indicated in FIG. 2, the plot of one half of the symmetrical autocorrelation function AC for the trace S1 produces a significant peak P1 spaced from the zero lag time axis Z by the approximate period $\tau 1$ of the multiples. Outstanding peaks or troughs away from the zero lag time are produced when multiples are aligned during the autocorrelation procedure. In FIG. 2, the peak P1 represents the occurrence of a nonalternating series of multiples. In FIG. 3, the valley or trough V1 represents the presence of an alternating series of multiples.

Given the length of the window D1 and the value of $\tau A$, the program determines the extremum value of the autocorrelation function within the window D1. This may be done by simply determining the time at which the extremum value of AC occurs within the window D1. The determined time, measured from Z, establishes the value to be employed for τ1. The value of τ1 from one trace is employed to establish the value of τA for the search for a new τ1 in the autocorrelation function of the next succeeding trace.

As indicated previously, the K multiplier represents a measure of the degree of similarity between the segments in windows A1 and B1 taken with the window A1 positioned relative to window B1 at the alignment where the maximum value of the crosscorrelation occurred. K values may vary over a relatively wide range to either side of 0.0 and 1.0. In the majority of cases, optimum performance of the program is obtained when the values of K are limited to values between and including 0.0-1.0. Where K is greater than 1, constructive interference is likely and one prime and a multiple may be in coincidence in the B1 window. Where this occurs, applying a K multiplier having a value in excess of 1 could undesirably effect a removal of the prime from the trace. Where the value of K is less than zero, an alternating series is normally present in the data. In some cases, depending upon the application, it may be desirable to establish upper and lower limits for K different than 0.0-1.0. For purposes of the description to follow, the K values are limited to 0.0-1.0.

The search lag, as well as the length of the window D1 is based on visual inspection of the relative data and is selected to be near the randomness of uncertainty in the period of an individual multiple. In the interests of efficiency and economy of computing time, the search lag SL and window D1 are made as small as possible consistent with proper operation of the method of the invention. If the period of the multiples is relatively constant, the search lag SL and window D1 length may be relatively small.

With the input parameters specified, the next step indicated at 12 is to set the number "N" of traces X in the record to be processed. The initial programming step is a test indicated at block 13. For purposes of the present explanation, assume that the program has just started on the first trace (X=1) or has just completed processing one trace and is now beginning a new trace and therefore the value for τ1 is not known. The program takes the NO exit to the next step indicated at 14. The value of τ1 obtained from the autocorrelation function is employed for all subsequent processing of the same trace.

Computation of the autocorrelation function is performed using a segment of the seismic trace falling between specified data points measured from the start time for the trace. As previously stated, the portion of the trace is selected by visual inspection to include a strong prime and several strong multiples. The same specified data points may be employed for each trace X in the record.

If the maximum absolute value found within the window D1 is for a negative amplitude, the resulting τ1 is found to be for an alternating series. This test is indicated at 15. If τ1 occurs at a positive amplitude peak, the multiple could be produced by a hard water bottom. Since the multiples to be suppressed will be either alternating or nonalternating, it is necessary to associate an arithmetic sign with the correction step. To this end, a multiplier M is set equal to 1 at step 16 or −1 at step 17 depending upon whether the detected trace amplitude is a peak or a trough respectively.

The steps indicated at 18, 19 and 20 may best be understood by reference to the example illustrated in FIG. 1. The windows A1 and A2 on the first portion of the trace S may be handled differently for the first one or two repetitions of pertinent steps of the method until the windows have been incremented to the right sufficiently that the left edge of the window A2 is not shifted to the left of the vertical axis or zero start time during the crosscorrelation procedure. Any suitable method, such as maintaining the left edges of windows A2 and A1 at the same place for the first one or two incrementations of the method, may be employed. In the latter procedure, the search lag to the left of the original position is prevented from going to the left of zero and the width of the window A2 may also be shortened. Depending on the length of the windows, the normal processing procedure may be reinitiated after the first one or two incrementations of the window B1.

Figure 4:
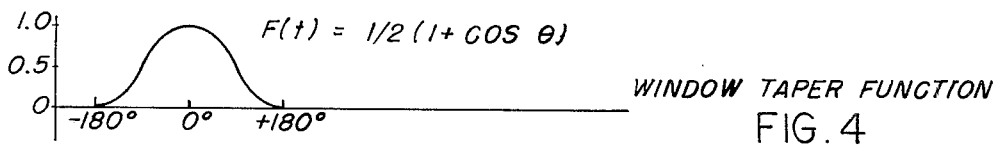
FIG. 4 illustrates the characteristic form for a cosine taper function employed in the method of the present invention.

The trace segment in window B2 is then "tapered" by multiplying each data point amplitude value in the window by the amplitude value at corresponding data points of a cosine taper function F(t) having the same length as the window B2. This step is indicated at block 21 in FIG. 6. The shape of the cosine taper function F(t) is illustrated in FIG. 4. The general equation for the Hamming taper function is given as:

$$F(t) = \tfrac{1}{2}(1 + \cos\theta) \quad (2)$$

$$-180° \leq \theta \leq +180°$$

where $\theta$ is the time interval of the window. Multiplication of the data in the window B2 by the taper function causes the data to go smoothly to zero at each edge of the window. This in turn assures that the process of the invention is implemented using data in adjacent windows in which the traces meet at the window edges.

In block 22, the multiplier M is applied and in block 23, the crosscorrelation function $\phi_{fg}(t')$ is computed. The latter function is given as $$\phi_{fg}(t') = \sum_{t=-N}^{N} f_t g_{t+t'} \quad (3)$$

where:

$f_t$ = the amplitude of the trace segment in window A2 at time t;

$g_{t+t'}$ = the amplitude of the trace segment in the window B2 at time t+t'.

The term "crosscorrelation" is employed herein in its conventional sense as more fully described in *Geophysics*, Vol. 33, No. 1 (February 1968) pg. 197. In effect, the trace segment within window A2 is compared, at each position within the range of movement SL, with the segment in window B2.

The time for the alignment of window A2 producing the maximum value in the crosscorrelation is measured relative to the original position of the window A2 to establish a T-MAX as indicated at block 24. From this, the adjusted period τN may be determined, as indicated at 25, from the relationship Ti  τN = τ1 − (T-MAX). (4)

The beginning point TA1 of window A1 is then defined relative to the beginning point TB1 of window B1 as indicated at block 26 from

TA1 = TB1 − τN. (5)

Exemplary indications of T-MAX, τ1, TA1, TB1 and τN are shown in FIG. 1.

Having thus positioned the window A1 about that portion of the trace segment most closely similar to that within the window B1, the multiplier K is determined at 27 as $$K = \sum_i \frac{A1_i \cdot B1_i}{(A1_i)^2} \qquad (6)$$

where:
$A1_i$ is the amplitude of the waveform in window A1 at a point i from the left edge of window A1;
$B1_i$ is the amplitude of the waveform in window B1 at a point i from the left edge of window B1;
i ranges incrementally at data point spacings from the left edge to the right edge of the windows A1 and B1.

The K multiplier, established as indicated, is a number which produces a minimum residual in the procedure of multiplying all of the points in the A1 window by K after the segment in window A1 has been tapered and pointwise subtracting the resulting values from the corresponding points in the B1 window. If the shapes in windows A1 and B1 are similar the residual is small. If they are dissimilar, a large residual remains.

Block 28 applies a test to determine if K is greater than the upper established limit (i.e. greater than +1 for the exemplary limits previously given). If it is not, but as indicated at test block 29, is lower than the lower limit (i.e., less than 0.0 in the exemplary values previously given), the steps in blocks 30 and 31 are eliminated and the trace segment is left as it appears in the original. It has been determined that the latter procedure produces the most accurate processing where the K multiplier value is lower than the established lower limit.

If the K value exceeds the established upper limit, it is set equal to the upper limit (i.e. 1 in the example given) at the step indicated at block 32. This threshold value or the value supplied from the test 29 is used in the step at block 31. In the step at 30, the taper function is defined to be coextensive with the window A1. The results of the step described at 31 are depicted graphically within a window C1 on a trace S2 in FIG. 5.

Figure 5:
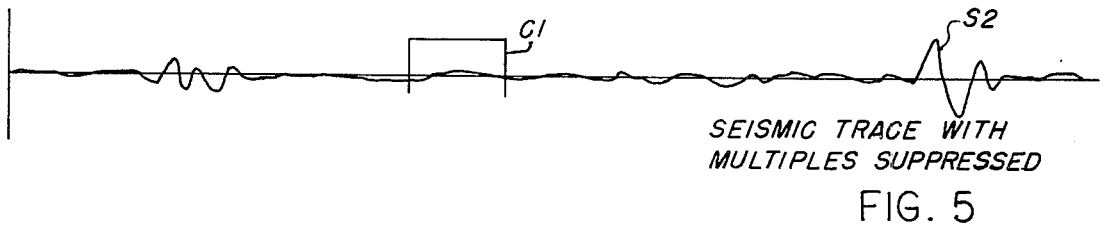
FIG. 5 illustrates the trace of FIG. 1 in which multiple events have been suppressed in accordance with the method of the present invention.

The test at 33 determines when a given trace is completely processed. The window B1 is advanced ½ of its length as indicated at 34 until a YES answer is produced at 33. The resulting processed trace is indicated in FIG. 5. Thereafter, the next trace is taken by setting X=X+1 at 35. The test at 36 is performed until a YES answer is obtained. Answers of NO in blocks 33 and 36 cause the appropriate procedures to be repeated until all of the traces in the record have been fully processed. It should be noted that the trace segments included within the incremented windows are those appearing in the original trace prior to any multiples removal or tapering. The process does not actually change the trace X but rather processes the values for the trace to produce a new trace having corrected values. In this regard also, the step of subtracting the K multiplied values of the segments in window A1 from those in window B1 may be performed at the end of the processing of the trace rather than at each incrementation. This may be done by forming a "correction trace" (not illustrated) comprised of all of the K multiplied values of the segments within the windows A1. The correction trace may be combined with the original trace S1 to form the difference trace S2. This latter procedure also cancels out the effect of the taper function. This occurs because increments of ½ window length will produce duplication of processing steps on each segment. The taper function is applied 90° out of phase with itself in the duplication so that a unity effect is produced.

Figure 7:
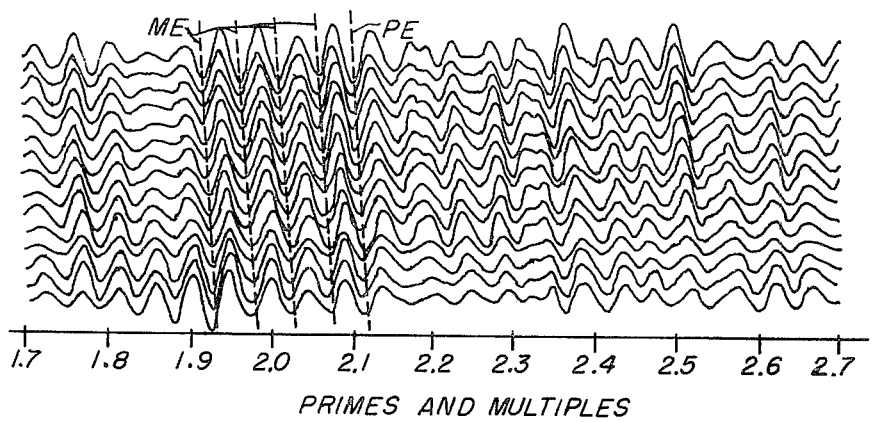
FIG. 7 is a portion of a seismic record illustrating reverberation type multiples mixed with prime events.
Figure 8:
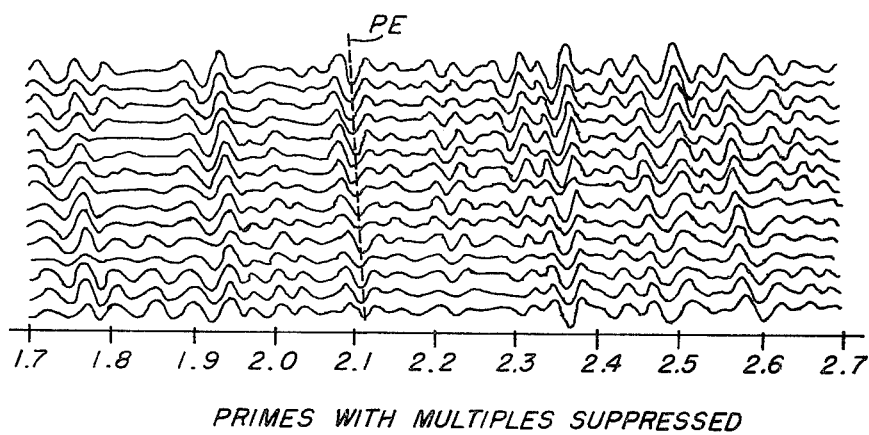
FIG. 8 illustrates the traces of FIG. 7 in which multiple events have been removed from the traces in accordance with the teachings of the present method.
Figure 9:
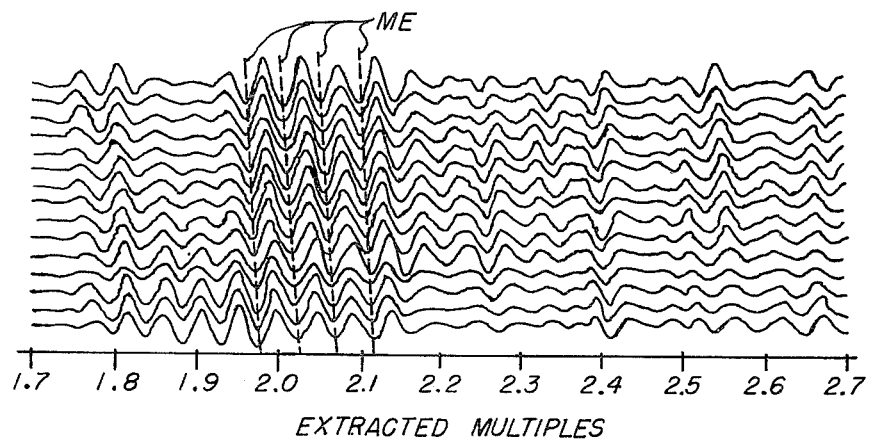
FIG. 9 illustrates the traces of FIG. 7 showing the multiples which were removed in accordance with the teachings of the present invention.

FIGS. 7–9 illustrate portions of actual records processed by the method of the present invention. FIG. 7 illustrates a portion of an actual record exhibiting reverberation type multiple events mixed with the prime events. The multiple events in FIGS. 7 and 9 are aligned along the lines ME and the prime events in FIGS. 7 and 8 are aligned along the lines PE. The record section as illustrated in FIG. 8 is significantly easier to employ and interpret since the desired prime events are not obscured by the undesired multiples.

It will be appreciated that the foregoing may make other embodiments of the basic method of the present invention apparent to those skilled in the art. It is the intention to cover all such changes and modifications as come within the true spirit of the scope of the present invention in the appended claims.

We claim:
1. A process for suppressing multiple events in seismic traces comprising the steps of:
   (a) comparing a first seismic trace segment with a second segment of the same trace to select that portion of the second segment which most closely resembles said first segment;
   (b) determining the degree of similarity between said selected portion and said first segment; and
   (c) extracting a part of said selected portion from said first portion, said part being a function of the degree of similarity between said selected portion and said first segment.

2. A process as defined in claim 1 wherein said steps are repeated along said trace at increments substantially equal to one-half the length of said first segment.

3. A process as defined in claim 1 wherein said first trace segment is spaced from said selected portion by the approximate period of the multiples to be suppressed.

4. A process as defined in claim 1 wherein said second trace segment is longer than said first segment.

5. A process as defined in claim 1 wherein:
   (a) a third segment of said trace, included as a portion of said first segment, and a fourth segment, included as a portion of said second segment, are employed to determine the degree of similarity between said third and fourth segments; and
   (b) said part is taken of said fourth segment and extracted from said third segment.

6. A process as defined in claim 5 wherein said process is repeated along said trace at increments substantially equal to one-half the width of said third segment.

7. A process as defined in claim 2 wherein said steps are repeated for the entire trace length of each of a plurality of traces.

8. A process as defined in claim 5 further including the initial step of determining the approximate period of the multiple for a given trace by calculating the autocorrelation function for said given trace and determining the time spacing between the zero lag time of said autocorrelation function and the occurrence in said autocorrelation function of a significant peak or valley exceeding a predetermined absolute amplitude value.

9. A process as defined in claim 8 wherein said autocorrelation function is calculated according to the relationship $$AC = \phi_{ff}(t') = \sum_{t=-N}^{N} f_t f_{t+t'}$$

where:
- $f_t$ = amplitude of the waveform of a seismic trace X at time t;
- $f_{t+t'}$ = amplitude of trace X at time $t+t'$;
- $t'$ = incremental shift during each autocorrelation.

10. A process as defined in claim 8 wherein:
(a) said initial step is repeated for each new trace in a plurality of traces;
(b) the approximate period of the multiples determined for each trace is employed to determine the approximate spacing between said zero lag time and said significant peak or valley in the autocorrelation function for the next trace in said plurality of traces to be processed; and
(c) a search for the maximum absolute value of said autocorrelation function is made on both sides of said approximate spacing to determine the approximate period of the multiples to be suppressed.

11. A process as defined in claim 5 further including the step of initially tapering said first and fourth segments with mathematical operators to cause the values for said first and fourth segments to start and finish with the same end values and to vary about a uniform function which extends uniformly away from said end values between the ends of said first and fourth segments.

12. A process as defined in claim 1 further including the step of applying a positive value to said part for suppressing positive amplitude excursions in said trace and applying a negative value to said part for suppressing negative amplitude excursions in said trace.

13. A process as defined in claim 9 wherein the step of selecting that portion of said second segment which most closely resembles said first segment is determined by the maximum value obtained from a crosscorrelation function $$\phi_{fg}(t') = \sum_{t=-N}^{N} f_t g_{t+t'}$$

where:
- $f_t$ = the amplitude of the trace segment in said selected portion at time t;
- $g_{t+t'}$ = the amplitude of the trace segment in said first segment at time $t+t'$.

14. A process as defined in claim 13 wherein the step of determining the degree of similarity between said selected portion and said first segment is determined by $$K = \sum_i \frac{A1_i \cdot B1_i}{(A1_i)^2}$$

where:
- K = the degree of similarity between said selected portion and said first segment;
- $A1_i$ = the amplitude of the waveform of said fourth segment at a point i from the left end of said fourth segment;
- $B1_i$ = the amplitude of the waveform of said third segment at a point i from the left edge of said third segment;
- i = the incremental spacing along the time axis at which amplitude values are taken.

15. A process as defined in claim 14 including the step of limiting the upper and lower values of K.

16. A process as defined in claim 15 wherein:
(a) the upper limit for the value of K is K=1;
(b) the lower limit for the value of K is K=0.0; and
(c) said first portion is left unaltered when K=1.

17. A process as defined in claim 14 further including the step of applying a positive value to said percentage for suppressing positive amplitude excursions in said trace and applying a negative value to said percentage for suppressing negative amplitude excursions in said trace.

18. A process as defined in claim 14 further including the step of initially tapering said first and fourth segments with mathematical operators to cause the values for said first and fourth segments to start and finish with the same end values and to vary about a uniform function which extends uniformly away from said end values between the ends of said first and fourth segments.

19. A process as defined in claim 18 wherein said mathematical operator is defined by $$F(t) = \tfrac{1}{2}(1+\cos\theta)$$
$$-180° \leq \theta \leq +180°$$

where $\theta$ = the respective time intervals for said first and fourth segments.

20. A process as defined in claim 19 wherein:
(a) the upper limit for the value of K is K=1;
(b) the lower limit for the value of K is K=0.0; and
(c) said first portion is left unaltered when K=1.

21. A process as defined in claim 20 further including the step of applying a positive value to said percentage for suppressing positive amplitude excursions in said trace and applying a negative value to said percentage for suppressing negative amplitude excursions in said trace.

22. A process as defined in claim 21 wherein said process is repeated along said trace at increments substantially equal to one-half the width of said third segment.

* * * * *